Feb. 21, 1933.  F. DITCHFIELD  1,898,347
HASP FASTENER
Filed June 17, 1931
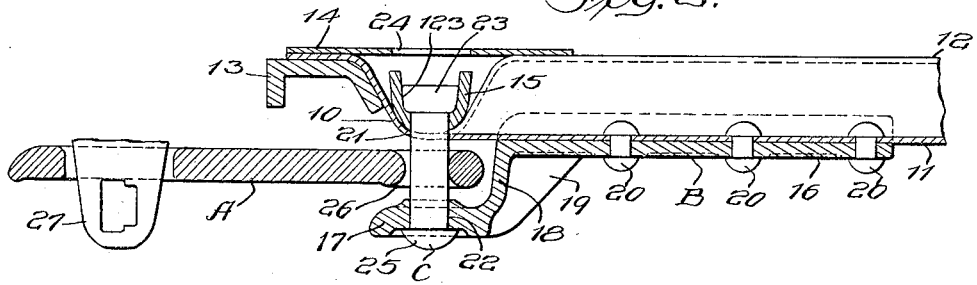
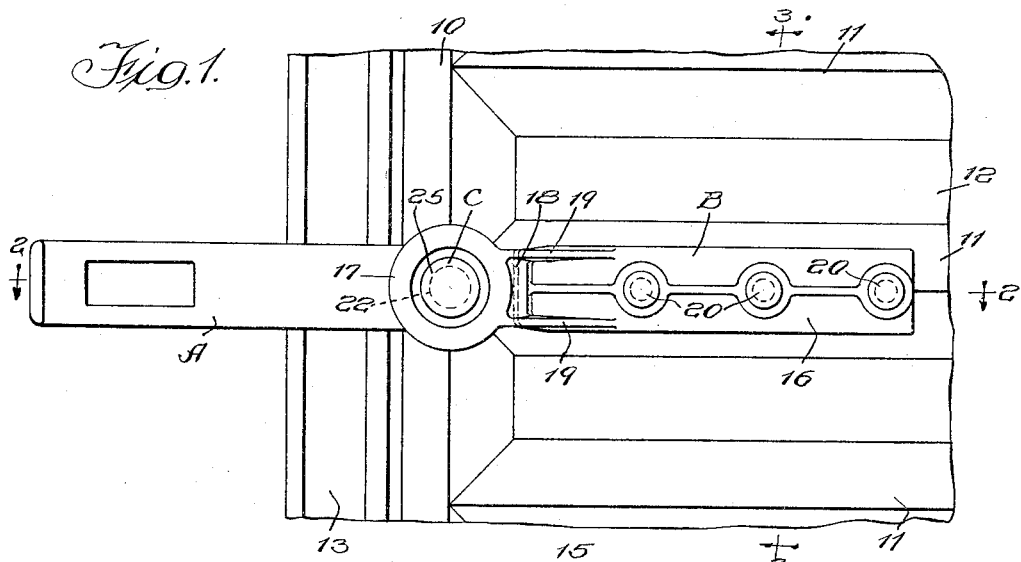
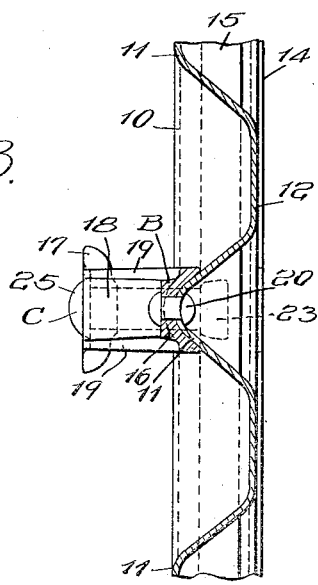
Witness:
William P. Kilroy
Inventor:
Frank Ditchfield
Joseph Harris
By His Attorney Patented Feb. 21, 1933

1,898,347

UNITED STATES PATENT OFFICE

FRANK DITCHFIELD, OF CLEVELAND, OHIO, ASSIGNOR TO THE YOUNGSTOWN STEEL DOOR COMPANY, OF CLEVELAND, OHIO, A CORPORATION OF OHIO

HASP FASTENER

Application filed June 17, 1931. Serial No. 544,946.

This invention relates to improvements in hasp fasteners, and more particularly to hasp fasteners designed for application to corrugated members such as sheet metal car doors of the type illustrated in my prior Patent 1,747,864, granted February 18, 1930, to which reference should be made for a clearer understanding of certain portions of the following description.

In the case of sheet metal doors, such as illustrated in my said prior patent, where the attachment of the hasp must be made at the intersection of two corrugations at right angles to each other, it has been the general practice heretofore to form the stem or post, on which the hasp proper is loosely mounted, at one end of the fastener proper and integral therewith, the end of such stem or post being further formed with a hook or tail piece. With this construction, the stem with its tail piece is first hooked or angled through the hole provided therefor in the door at the point of intersection of the corrugations and, after being hooked within the hole, the fastener proper is then riveted along the crest of the horizontal corrugation. Generally, also, the vertical corrugation is provided with an interior bracing element of U-cross section, as shown in my said prior patent, the bracing element being perforated in line with the opening through the sheet metal door proper to receive the stem and tail piece of the hasp fastener.

Experience has demonstrated that there are several disadvantages arising from the use of a hasp fastener arrangement of the type above referred to. Because of the necessity of "angling" the fastener in order to enter the stem and tail piece within the holes provided therefor, the holes have had to be made relatively large, thus leaving a space around the stem when the fastener proper is finally riveted in place. Such space around the stem permits entrance of rain, snow and the like and induces excessive corrosion. Furthermore, on account of the loose fit of the stem within the holes of the door and reinforcing element, the repeated oscillations thereof induced by the severe stresses imposed on the hasp when the door is pushed or bumped harshly back and forth, causes rapid wear on the stem or post with frequent complete tearing out of the stem or post. When this occurs, due to the stem or post being formed integrally with the main portion of the fastener proper, a replacement involves the removal of all the fastener rivets and the scrapping of the entire fastener.

One object of my invention is to provide a fastener or attachment for hasps which will eliminate or at least minimize the several disadvantages hereinbefore pointed out.

Another object of my invention is to provide a hasp fastener or attachment particularly adapted for corrugated sheet metal doors which may be easily attached and so arranged that the part subject to the greatest wear, the stem or post, may be readily and economically replaced without the necessity of replacing the main portion of the fastener which is riveted to the door.

Other objects of the invention will more clearly appear from the description and claim hereinafter following.

In the drawing forming a part of this specification, Figure 1 is a front elevational view of a portion of a corrugated sheet metal car door showing my improvements incorporated therewith. Figure 2 is a horizontal, sectional view, corresponding to the line 2—2 of Figure 1. And Figure 3 is a vertical, sectional view corresponding to the line 3—3 of Figure 1.

In said drawing, I have deemed it necessary to indicate only a portion of a sheet metal car door such as shown in my said Patent 1,747,864, and another illustration of which may be found in Barrows Patent 1,698,118 of January 8, 1929. The door is of the horizontal slidable type and the door to which my improved fastener is attached may be either a door of the single type or the main door of a double door arrangement.

As shown, the door is comprised essentially of sheet metal having, along its front vertical edge, a vertically extending outwardly disposed corrugation 10 with which are merged the ends of a plurality of horizontally extending corrugations 11—11, all of said corrugations being disposed outwardly from the original or main plane of the door sheets, which is indicated at 12. As customary in said type of door, the forward edge thereof is provided with a reinforcing angle 13 and the vertical corrugation 10, as usual, is braced by a bridging plate 14 on the inner face of the door, said bridging plate 14 extending throughout the vertical height of the corrugation 10 and riveted or spot welded along each of its sides to the main sheets of the door at opposite sides of the corrugation 10. As also generally practiced, doors of the type indicated will have a reinforcing element 15 of generally U-cross section seated within the vertical corrugation 10 and riveted or spot welded thereto.

In carrying out my invention, the hasp arrangement includes a hasp proper A; a fastener proper or attaching member B; and a post or stem C for the hasp.

The fastener proper B may be of drop forged steel and comprises a main elongated section 16 and an outwardly offset section or boss 17 united to the main portion 16 by a web 18 suitably reinforced by ribs 19—19. The main section 16 of the fastener proper is curved on its inner side, as best shown in Figure 3, so as to fit the crest of the horizontal corrugation 11 to which it is permanently secured by any suitable means such as the horizontally arranged series of rivets 20—20, access to which is obviously obtainable at both ends of the rivets from the outer side of the fastener B and the interior of the open corrugation 11.

The sheet metal of the door proper is perforated preferably at the point of intersection of the horizontal corrugation and vertical corrugation with a hole just sufficient to receive the shank of the post or stem C. Likewise, the reinforcing element 15 within the vertical corrugation is similarly perforated, as indicated at 21. The boss or offset section 17 of the fastener proper is provided with a corresponding alined opening 22. The post or stem C is preferably in the form of a rivet with a square head 23 at its inner end, the sides of which, as indicated at 123, are formed to fit the interior of the reinforcing member 15. To permit application and removal of the post or stem C from the inner side of the door, the bridging plate 14 has an opening 24 formed therein of sufficient size to permit passage of the rivet head 23 and also to permit the use of a backing tool when the outer end of the rivet is headed to its final form, as indicated at 25. The hasp A is perforated or looped, as indicated at 26, so as to loosely fit over the post C and permit the necessary swinging of the hasp to be applied over and removed from a staple, such as indicated at 27, which staple will be carried either by the fixed wall of the car when my arrangement is applied to a single door or which will be on an auxiliary door when my arrangement is applied to the main door of a double door arrangement.

With the construction shown and described, it is evident that possibility of rain or other foreign matter entering through the door to the interior of the vertical corrugation is reduced to a minimum, since a snug fit may be made between the post shank and the openings in the door. Furthermore, all play of the post or stem C with reference to either the door proper or the fastener B proper, is eliminated since the headed rivet may be drawn up tight, thus eliminating or minimizing the possibility of wear in any of the openings such as heretofore occurred when there was a certain amount of loose play of the parts. Inasmuch as the post or stem C is the part which receives the greatest wear, due to the push and pulls imposed thereon by the hasp A, it is evident that it may be readily replaced at any time by chipping off the outer head 25 and inserting a new one without the necessity of disturbing the fastener proper B or removing the bridging plate 14.

I have herein shown and described what I now consider the preferred manner of carrying out the invention, but the same is merely illustrative and I contemplate all changes and modifications that come within the scope of the claim appended hereto.

I claim:

A hasp fastener for that type of fabricated sheet metal door having a horizontal corrugation merging at its end with a vertical corrugation, the latter being interiorly reinforced by an element of substantially U-section seated therewithin and provided with a bridging plate extending lengthwise of the vertical corrugation, the hasp fastener comprising: a fastener proper adapted to extend lengthwise of and be permanently secured to the crest of the horizontal corrugation and having its forward end outwardly offset in a position over the junction point of the vertical and horizontal corrugations; a rivet headed separate post, said offset end, vertical corrugation and reinforcing element having alined openings for snugly receiving the shank of said post, the inner headed end of the post being seated within said U-sectioned reinforcing element and the bridging plate having an opening alined with the post to permit insertion and withdrawal thereof after the door has been completely fabricated; and a hasp proper perforated at one end to loosely receive the shank of the post therein and permit angling of the hasp with respect to the post, pulling and pushing stresses imposed on the hasp proper being transmitted initially direct to the shank of the post.

In witness that I claim the foregoing I have hereunto subscribed my name this 11th day of June 1931.

FRANK DITCHFIELD.